(12) United States Patent
Yoshida

(10) Patent No.: US 7,244,100 B2
(45) Date of Patent: *Jul. 17, 2007

(54) HORIZONTAL AXIS WIND TURBINE AND METHOD FOR CONTROLLING HORIZONTAL AXIS WIND TURBINE

(75) Inventor: Shigeo Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 127 days.

This patent is subject to a terminal disclaimer.

(21) Appl. No.: 11/051,633

(22) Filed: Jan. 27, 2005

(65) Prior Publication Data

US 2005/0169755 A1    Aug. 4, 2005

(30) Foreign Application Priority Data

Jan. 29, 2004    (JP)    ............................ 2004-021180

(51) Int. Cl.
F03D 7/04    (2006.01)
(52) U.S. Cl. ................... 416/9; 416/41; 416/61; 415/4.3; 73/170.01
(58) Field of Classification Search ............... 415/2.1, 415/4.1, 4.3, 4.5, 905, 908, 14, 26, 118; 416/1, 416/9, 35, 41, 10, 61; 73/861.79, 1.29, 861.85, 73/170.07, 170.11
See application file for complete search history.

(56) References Cited

U.S. PATENT DOCUMENTS

| | | | |
|---|---|---|---|
| 5,289,041 A | | 2/1994 | Holley |
| 7,086,835 B2 * | | 8/2006 | Yoshida ..................... 416/9 |

FOREIGN PATENT DOCUMENTS

| | | | |
|---|---|---|---|
| EP | 1 429 025 A1 | | 6/2004 |
| EP | 1 505 299 A1 | | 2/2005 |
| GB | 2067247 A | * | 7/1981 |
| JP | 57 051966 A | | 3/1982 |
| JP | 2004 190496 A | | 7/2004 |
| JP | 2005188455 A | * | 7/2005 |

* cited by examiner

*Primary Examiner*—Richard A. Edgar
(74) *Attorney, Agent, or Firm*—Birch, Stewart, Kolasch & Birch, LLP

(57) ABSTRACT

A horizontal axis wind turbine of an upwind type includes: a rotor for rotating around a rotor axis extending in a horizontal direction, the rotor being turned in a horizontal plane according to a wind direction; a nacelle having a symmetrical shape with respect to an imaginary plane including the rotor axis and extending a vertical direction; two anemometers disposed at positions of both side portions of the nacelle, the positions opposing each other across the imaginary plane; and a controller for controlling a yaw angle of the rotor based on wind speeds measured by the two anemometers.

19 Claims, 4 Drawing Sheets

HORIZONTAL AXIS WIND TURBINE AND METHOD FOR CONTROLLING HORIZONTAL AXIS WIND TURBINE

BACKGROUND OF THE INVENTION

1. Field of the Invention

The present invention relates to a horizontal axis wind turbine and a method for controlling a horizontal axis wind turbine.

2. Description of Related Art

In recent years, horizontal axis wind turbines have been proposed and in practical use in order to generate electric power from natural wind. Such a horizontal axis wind turbine is provided with a yaw sensor, such as a yaw vane, for measuring the direction of the wind blowing against the rotor (wind direction). A control device of the horizontal axis wind turbine performs "yaw control" of starting rotation of the rotor as well as rotates the rotor axis in a substantially horizontal plane in such a way that the rotor faces the wind direction measured by the yaw sensor, i.e., the yaw angle (the angle between the direction of the rotor axis and the wind direction) is made to converge to about 0 degree.

By the way, most of commercial wind turbines used nowadays is an upwind turbine in which a rotor 100 is located on the windward side as shown in FIGS. 6-8. A yaw sensor 200 of the upwind turbine is generally located from a substantial central portion to a posterior portion of the rotor axis direction of the upper portion of a nacelle 300.

However, wind turbines are often installed in complex topography and, in the topography, an upflow wind (blowing up) is often generated. Therefore, when the yaw sensor 200 is located on the upper portion of the nacelle 300 as shown in FIGS. 6-8, measurement accuracies of the wind direction and the yaw angle is degraded significantly by an effect of the nacelle 300. As a result of this, there is a problem that an error occurs between the yaw angle φ measured by the yaw sensor 200 and the actual yaw angle φ and so the yaw control of the rotor 100 is not performed accurately.

FIG. 9 shows measurement errors of a yaw angle caused by such an upflow angle and is a graph showing results of a wind tunnel test of measurement values of the yaw angle in case of locating the yaw sensor 200 on the upper portion of the nacelle 300 as shown in FIGS. 6-8. In FIG. 9, the horizontal coordinate is a value of a yaw angle φ in case of an upflow angle of 0 degree (hereinafter referred to as a "true yaw angle value") and the vertical coordinate is a difference between a value of the yaw angle φ measured by the yaw sensor 200 in case of an upflow angle of 0 degree to +30 degree and a value of the yaw angle φ in case of an upflow angle of 0 degree (hereinafter referred as to a "yaw angle measurement error".

For example, in the case that an upflow having an upflow angle of +30 degree is blowing against the rotor 100, a yaw angle measurement error (the vertical coordinate) changes from about −30 degree to about +10 degree by about +40 degree corresponding to a true yaw angle value (the horizontal coordinate) changing from 0 degree to +10 degree by +10 degree (see FIG. 9: curve E). That is, a value of the yaw angle φ measured by the yaw sensor 200 is measured as changing by about +50 degree, corresponding to a value of the actual yaw angle φ changing by +10 degree. Therefore yaw control of the rotor 100 is repeated although the change of the wind direction is slight.

Such measurement errors of a yaw angle caused by an upflow angle can be reduced slightly by locating the yaw sensor 200 at a high position not to be affected by the nacelle 300. However, there is a problem that the yaw sensor 200 shakes easily, its durability is degraded and a more cost is required because this means makes a supporting rod 210 supporting the yaw sensor 200 very long.

SUMMARY OF THE INVENTION

The present invention achieves an accurate yaw control in a horizontal axis wind turbine of an upwind type installed at a site where an upflow is often generated.

In order to resolve the above-described problem, in accordance with the first aspect of the present invention, a horizontal axis wind turbine of an upwind type comprises: a rotor for rotating around a rotor axis extending in a horizontal direction, the rotor being turned in a horizontal plane according to a wind direction; a nacelle having a symmetrical shape with respect to an imaginary plane including the rotor axis and extending a vertical direction; two anemometers disposed at positions of both side portions of the nacelle, the positions opposing each other across the imaginary plane; and a controller for controlling a yaw angle of the rotor based on wind speeds measured by the two anemometers.

According to the first aspect of the invention, difference is generated in wind speeds measured by the two anemometers regardless of the presence or absence of an upflow when the rotor does not face opposite the wind direction because of comprising a nacelle having a symmetrical shape with respect to an imaginary plane including the rotor axis and extending a vertical direction and two anemometers disposed at positions of both side portions of the nacelle which oppose each other across the imaginary plane. The controller controls the yaw angle of the rotor based on the wind speeds measured by the two anemometers in this way. For example, it is possible to estimate the yaw angle of the rotor based on the difference or ratio of the wind speed measured by the two anemometers and turn the rotor in the horizontal plane so that the estimated yaw angle converges to 0 degree (so that the rotor faces opposite the wind direction).

Accordingly, it is possible to achieve accurate yaw control by using the two anemometers even in case of the horizontal axis wind turbine installed at a site where an upflow is often generate. Additionally, a yaw sensor is unnecessary because yaw control can be performed by using two anemometers, and accordingly, maintenance is facilitated and it is possible to retrench a cost required for production and attachment of a yaw sensor.

Preferably, in the wind turbine, the controller estimates the yaw angle of the rotor based on at least one of a difference and a ratio of the wind speeds measured by the two anemometer, and turns the rotor so that the estimated yaw angle converges to 0 degree.

According to this invention, the yaw angle of the rotor is estimated based on the difference or ratio of the wind speed measured by the two anemometers. Then, it is possible to turn the rotor in the horizontal plane so that the estimated yaw angle converges to 0 degree (i.e., so as to make the rotor face opposite the wind direction).

In accordance with the second aspect of the invention, a method for controlling the wind turbine comprises: estimating the yaw angle of the rotor based on at least one of a difference and a ratio of the wind speeds measured by the two anemometers; and turning the rotor so that the estimated yaw converges to 0 degree.

According to the second aspect of the invention, the yaw angle of the rotor is estimated based on the difference or ratio of the wind speed measured by the two anemometers. Then, it is possible to turn the rotor in the horizontal plane so that the estimated yaw angle converges to 0 degree (i.e., so as to make the rotor face opposite the wind direction).

In accordance with the third aspect of the invention, a method for controlling the wind turbine comprises: determining whether a difference of the wind speeds measured by the two anemometers is not more than a predetermined threshold; turning the rotor to one anemometer which measures a higher wind speed than other anemometer, when the difference of the wind speeds exceeds the threshold; and stopping the turning of the rotor when the difference of the wind speeds falls not more than the threshold.

According to the third aspect of the invention, when the difference of the wind speeds measured by the two anemometers exceeds the threshold, the rotor is turned to the anemometer measuring a higher value than the other anemometer, and when the wind speed difference falls not more than the threshold, the turning of the rotor is stopped. Accordingly, it is possible to achieve the yaw control by an incredibly simple control logic using values of the wind speeds measured by the two anemometers.

In accordance with the fourth aspect of the invention, a method for controlling the wind turbine comprises turning the rotor to equalize the wind speeds measured by the two anemometers.

According to the fourth aspect of the invention, the rotor can be made to face opposite the wind direction by turning the rotor to equalize values of the wind speeds measured by the two anemometers.

In accordance with the fifth aspect of the invention, a horizontal axis wind turbine comprises: a rotor for rotating around a rotor axis extending in a horizontal direction; a nacelle having a symmetrical shape with respect to an imaginary plane including the rotor axis and extending a vertical direction; two anemometers disposed at both side portions so that wind speeds measured by the anemometers are different except when a yaw angle of the rotor is 0 degree; and a controller for controlling the yaw angle of the rotor based on the wind speeds measured by the two anemometer.

Preferably, the wind turbine is a horizontal axis wind turbine of an upwind type.

Preferably, the controller controls the yaw angle based on at least one of a difference and a ratio between the wind speeds measured by the two anemometers.

Preferably, the controller compares the wind speeds measured by the two anemometers and turns the rotor to one anemometer which measures a higher wind speed than other anemometer.

Preferably, the controller calculates a control determination value from the wind speeds measured by the two anemometers; determines whether the control determination value is within a predetermined range or not; turns the rotor to an anemometer which measures a higher wind speed than other anemometer, when the control determination value is out of the predetermined range; and stops turning the rotor when the control determination value comes within the range.

Preferably, the controller determines whether a difference of the wind speeds measured by the two anemometers is not more than a predetermined threshold; turns the rotor to one anemometer which measures a higher wind speed than other anemometer, when the difference of the wind speeds exceeds the threshold; and stops turning the rotor when the difference of the wind speeds falls not more than the threshold.

Preferably, the controller estimates the yaw angle of the rotor based on the wind speeds measured by the two anemometers, and turns the rotor so that the estimated yaw angle converges to 0 degree.

Preferably, the controller turns the rotor to equalize the wind speeds measured by the two anemometers.

In accordance with the sixth aspect of the invention, a method for controlling the wind turbine comprises:
  controlling the yaw angle based on at least one of a difference and a ratio between the wind speeds measured by the two anemometers.

In accordance with the seventh aspect of the invention, a method for controlling the wind turbine comprises:
  comparing the wind speeds measured by the two anemometers; and
  turning the rotor to an anemometer which measures a higher wind speed than other anemometer.

In accordance with the eighth aspect of the invention, a method for controlling the wind turbine comprises:
  calculating a control determination value from the wind speeds measured by the two anemometers;
  determining whether the control determination value is within a predetermined range or not;
  turning the rotor to an anemometer which measures a higher wind speed than other anemometer, when the control determination value is out of the predetermined range; and
  stopping turning the rotor when the control determination value comes within the range.

In accordance with the ninth aspect of the invention, a method for controlling the wind turbine comprises:
  determining whether a difference of the wind speeds measured by the two anemometers is not more than a predetermined threshold;
  turning the rotor to one anemometer which measures a higher wind speed than other anemometer, when the difference of the wind speeds exceeds the threshold; and
  stopping turning the rotor when the difference of the wind speeds falls not more than the threshold.

In accordance with the tenth aspect of the invention, a method for controlling the wind turbine comprises:
  estimating the yaw angle of the rotor based on the wind speeds measured by the two anemometers; and
  turning the rotor so that the estimated yaw angle converges to 0 degree.

In accordance with the eleventh aspect of the invention, a method for controlling the wind turbine comprises:
  turning the rotor to equalize the wind speeds measured by the two anemometers.

According to the present invention, difference is generated in wind speeds measured by the two anemometers regardless of the presence or absence of an upflow because respective anemometers are disposed in the both side portions. The yaw control of the rotor can be performed based on difference or ratio of the wind speeds measured by the two anemometers. Accordingly, it is possible to achieve accurate yaw control by using the two anemometers even in case of the horizontal axis wind turbine installed at a site where an upflow is often generate.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

DETAILED DESCRIPTION OF THE INVENTION

Hereinbelow, an embodiment of the present invention will be described in detail with drawings. In the present embodiment, a downwind horizontal axis wind turbine 1 shown in FIGS. 1 to 3 is adopted as an example of a horizontal axis wind turbine.

First, a configuration of the horizontal axis wind turbine 1 according to the present embodiment will be described. As shown in FIGS. 1 to 4, the horizontal axis wind turbine 1 comprises: a tower 2 installed at a predetermined site; a nacelle 3 attached to the top of the tower 2 rotatably in a substantially horizontal plane; a main shaft (not shown) extending in a substantially horizontal direction inside the nacelle 3; a rotor 4 attached to the main shaft; an anemometer L and an anemometer R attached to both side portions of the nacelle 3; a control device (not shown) for integrating and controlling the whole of the horizontal axis wind turbine 1; and the like.

Figure 1:
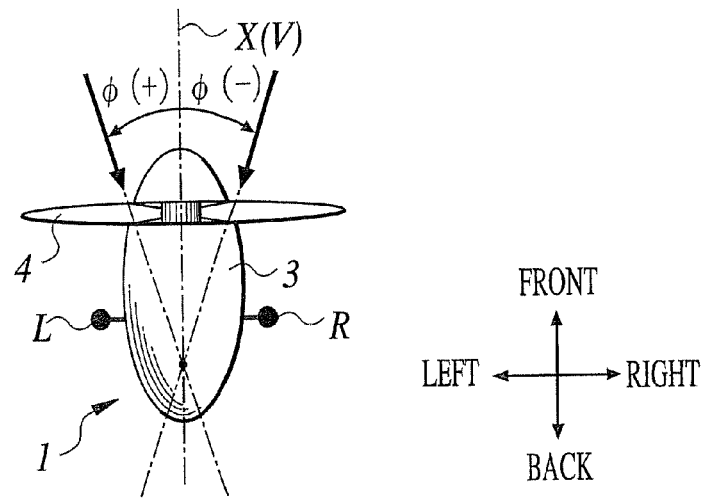
FIG. 1 is a top view showing a horizontal axis wind turbine according the embodiment of the present invention.
Figure 2:
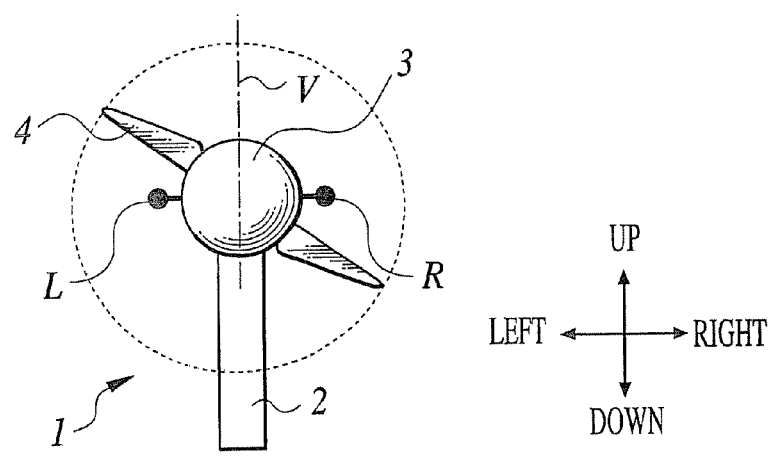
FIG. 2 is a back view showing the horizontal axis wind turbine according the embodiment of the present invention.
Figure 3:
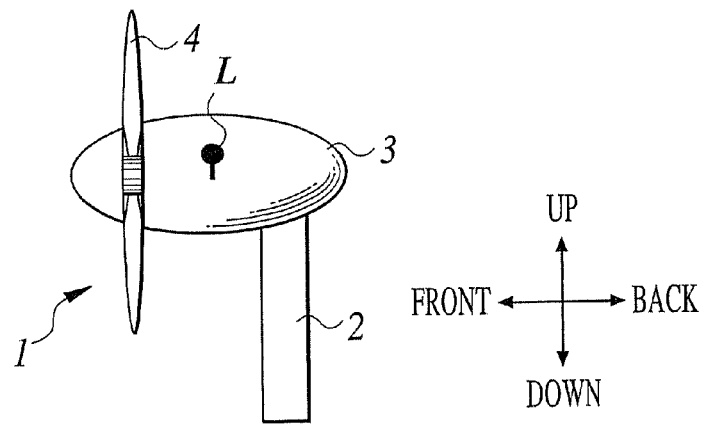
FIG. 3 is a left side view showing the horizontal axis wind turbine according the embodiment of the present invention.

The nacelle 3 has, as shown in FIGS. 1 to 3, a symmetrical form with respect to an imaginary plane V including the rotor axis X of a rotor 4 and extending in the vertical direction. The anemometer L is disposed on the left-side portion of the nacelle 3 and the anemometer R is disposed on the right-side portion. The anemometer L and anemometer R are disposed at the positions that substantially oppose to each other with the imaginary plane V between them.

In the present embodiment, rotation anemometers in which a plurality of cups catch the wind blowing against the rotor center of the horizontal axis wind turbine 1 and the wind speed is measured from the speed thereof are adopted as the anemometer L and the anemometer R. The type of the anemometer L and the anemometer R is not limited in particular. Therefore the type used conventionally (for example, the type of the anemometer manufactured by Vaisala or Thies) may be adopted.

The control device performs a calculation process for calculating a difference (hereinafter, referred to as "wind speed difference") or a ratio (hereinafter, referred to as "wind speed ratio") between a value of the wind speed measured by the anemometer L and a value of the wind speed measured by the anemometer R, an estimation process for estimating the yaw angle Φ by using the wind speed difference correlation data or the wind speed ratio correlation data, which will be explained below, by executing the predetermined programs. Additionally, the control device controls the yaw angle Φ of the rotor 4 based on the wind speeds measured by the anemometer L and the anemometer R. That is, the control device is the controller of the present invention.

Secondly the relationship between values of the wind speeds measured by the two anemometers (the anemometer L and the anemometer R) of the horizontal axis wind turbine 1 according to the embodiment of the present invention and the yaw angle Φ will be described with FIGS. 1 to 5.

The anemometer L and the anemometer R are disposed on the both side portions of the nacelle 3. Therefore a difference is generated between a value of the wind speed measured by the anemometer L and a value of the wind speed measured by the anemometer R in the case that the wind blows diagonally from the front of rotor 4. The same is true in the case that an upflow having an upflow angle blows against the rotor 4.

For example, when plus and minus of the yaw angle Φ are defined as shown in FIG. 1, the effect of the nacelle 3 makes a value of the wind speed measured by the anemometer L higher than a value the wind speed measured by the anemometer R in the case that the yaw angle Φ is plus (+), that is, the wind blows from the left side of the rotor axis X of the rotor 4. On the other hand, the effect of the nacelle 3 makes a value of the wind speed measured by the anemometer L lower than a value of the wind speed measured by the anemometer R in the case that the yaw angle Φ is minus (−), that is, the wind blows from the right side of the rotor axis X.

Therefore a certain relationship is made between: the difference (speed difference) or the ratio (speed ratio) between a value of the wind speed measured by the anemometer L and a value of the wind speed measured by the anemometer R; and the yaw angle Φ. In the present embodiment, data according to the relationship between the wind speed difference and the yaw angle Φ (wind speed difference correlation data) and data according to the relationship between the wind speed ratio and the yaw angle Φ (wind speed ratio correlation data) are obtained by means of ground-based experiments in advance. The wind speed difference correlation data and the wind speed ratio correlation data are stored in the memory in the nacelle 3.

Figure 4:
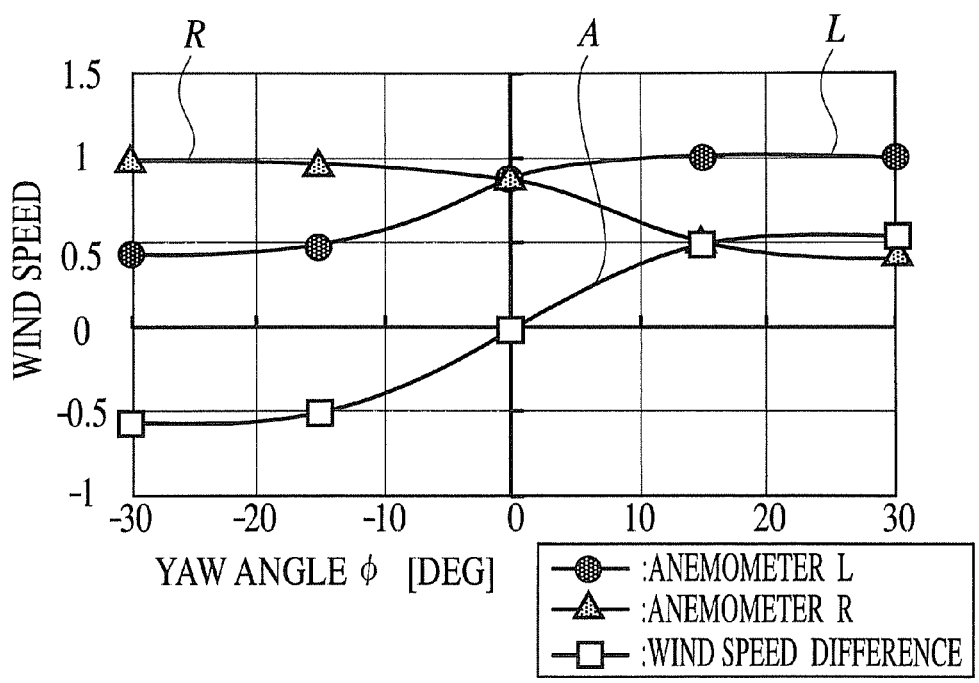
FIG. 4 shows correlation data of a wind speed difference (a graph showing the relationship between a wind speed difference and the yaw angle) stored in a memory of the horizontal axis wind turbine shown in FIGS. 1 to 3.

The graph showing relationship between the difference in the wind speeds and the yaw angle Φ shown in FIG. 4 may be employed as the wind speed difference correlation data. In the graph of FIG. 4, the vertical coordinate is "wind speed" and the horizontal coordinate is "yaw angle Φ (degree)". Values of "wind speed" of vertical coordinate in FIG. 4 are ratios (non-dimensional values) of measured values to the wind speed.

A curve L in FIG. 4 is formed by plotting a point on a graph at the wind speed value measured by the anemometer L in each case that the yaw angle Φ is "−30 degree", "−15 degree", "0 degree", "15 degree", and "30 degree" and by connecting these points with an approximating curve. The wind speed value measured by the anemometer L becomes the minimum at an yaw angle Φ of "−30 degree", increases gradually as the yaw angle Φ changes from a minus to a plus, and converges to "1" (an uniform flow) at the yaw angle Φ approaching about "15 degree" (see FIG. 4). The reason is that the wind is blocked because the anemometer L lies behind the nacelle 3 in the case that the yaw angle Φ is minus.

A curve R in FIG. 4 is formed by plotting a point on a graph at the wind speed value measured by the anemometer R in each case that the yaw angle Φ is "−30 degree", "−15 degree", "0 degree", "15 degree", and "30 degree" and by connecting these points with an approximating curve. The wind speed value measured by the anemometer R becomes the minimum at an yaw angle Φ of "30 degree", increases gradually as the yaw angle Φ changes from a plus to a minus, and converges to "1" (an uniform flow) at the yaw angle Φ approaching about "−15 degree"(see FIG. 4). The reason is that the wind is blocked because the anemometer R lies behind the nacelle 3 in the case that the yaw angle Φ is plus.

That is, the curve L and the curve R are mutually symmetric with respect to the line of "the yaw angle Φ=0 (degree)" (see FIG. 4).

A curve A in FIG. 4 is formed by plotting a point on a graph at a value that is the wind speed value measured by the anemometer L minus the wind speed value measured by the anemometer R (wind speed difference) in each case that the yaw angle Φ is "−30 degree", "−15 degree", "0 degree", "15 degree", and "30 degree" and by connecting these points with an approximating curve. The wind speed difference corresponds to the yaw angle Φ due to the curve A. The yaw angle Φ may be estimated by using the curve A and the wind speed difference calculated from measurement of values of the wind speed by the anemometer L and the anemometer R. For example, if the wind speed difference is "0.5", the yaw angle Φ is estimated at "about 15 degree or more" (see FIG. 4).

Because it is difficult to provide means for measuring the actual wind speed, the value measured by the anemometer L or the anemometer R may be used as the wind speed. In this case, the control device is made to store data using the values measured by the anemometer L or the anemometer R as a wind speed. A greater value of the values measured by the anemometer L and the anemometer R may be also used as a substitute for the wind speed.

Figure 5:
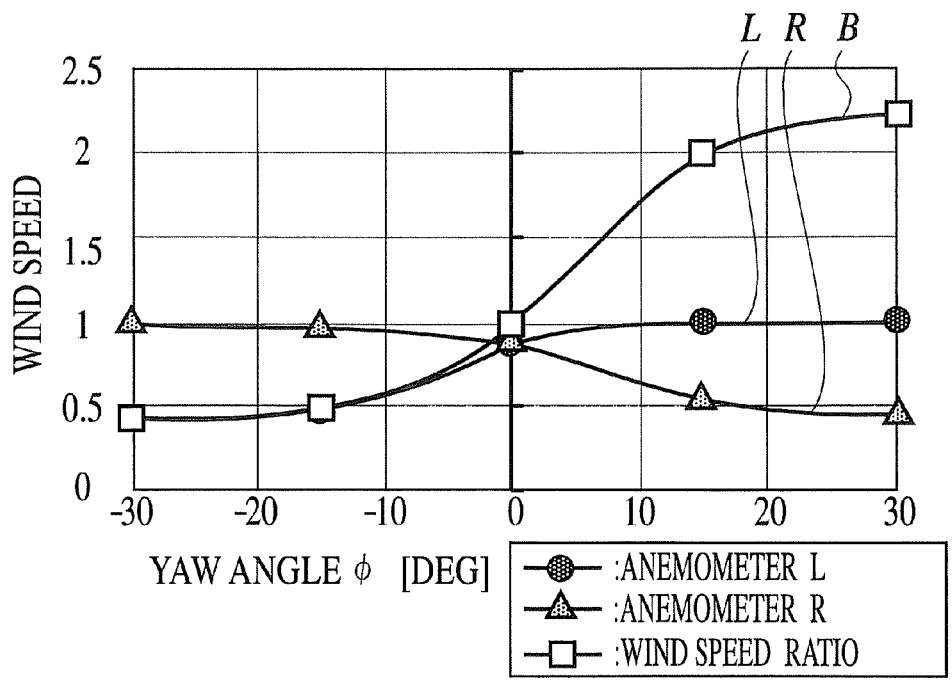
FIG. 5 shows correlation data of a wind speed ratio (a graph showing the relationship between a wind speed ratio and the yaw angle) stored in a memory of the horizontal axis wind turbine shown in FIGS. 1 to 3.
Figure 6:
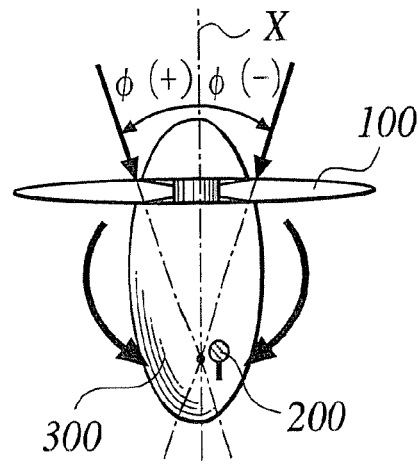
FIG. 6 is a top view showing a conventional horizontal axis wind turbine of an upwind type.
Figure 7:
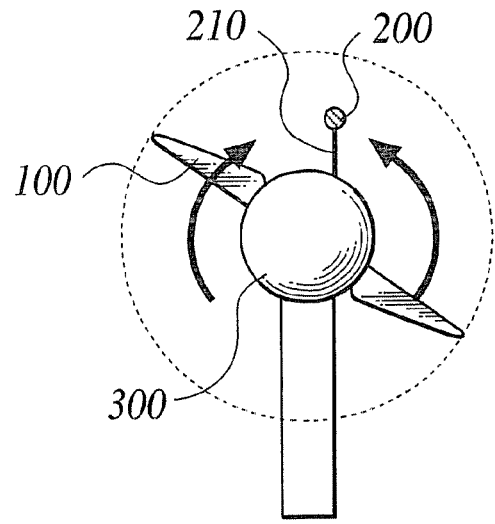
FIG. 7 is a back view showing the conventional upwind horizontal axis wind turbine of the upwind type.
Figure 8:
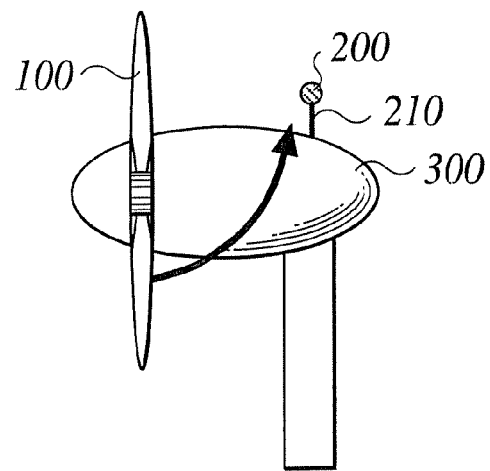
FIG. 8 is a left side view showing the conventional upwind horizontal axis wind turbine of the upwind type.
Figure 9:
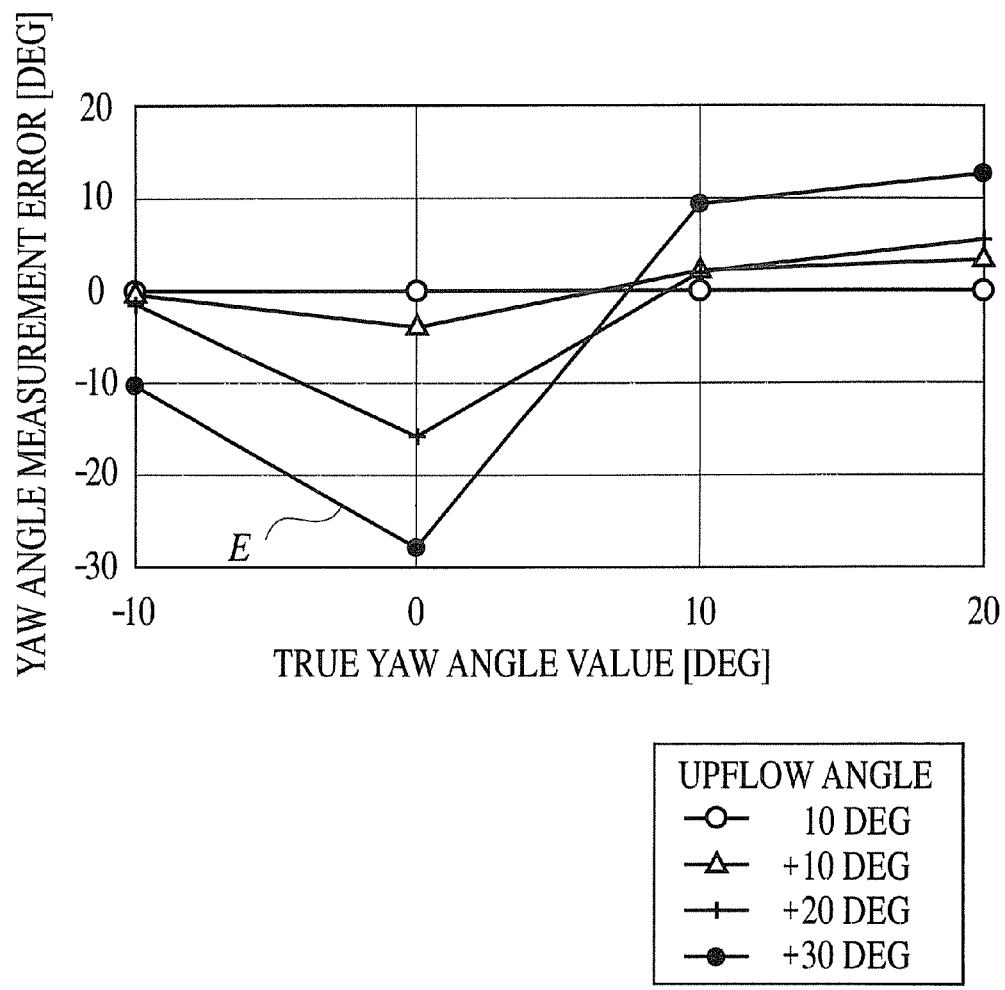
FIG. 9 is a graph showing measurement errors of a yaw angle caused by an upflow.

The graph showing relationship between the ratio between the wind speeds and the yaw angle Φ shown in FIG. 5 may be employed as the wind speed ratio correlation data. In the graph of FIG. 5, the vertical coordinate is "wind speed" and the horizontal coordinate is "yaw angle Φ (degree)". Values of "wind speed" of vertical coordinate in FIG. 5 are ratios (non-dimensional values) of measured values to wind speed undisturbed by the wind turbine. A curve L and a curve R in FIG. 5 are the same as the curve L and the curve R in FIG. 4 (only the scale of the vertical coordinate is changed).

A curve B in FIG. 5 is formed by plotting a point on a graph at a value that equals the wind speed value measured by the anemometer L divided by the wind speed value measured by the anemometer R (wind speed ratio) in each case that the yaw angle Φ is "−30 degree", "−15 degree", "0 degree", "15 degree", and "30 degree" and by connecting these points with an approximating curve. The wind speed ratio corresponds to the yaw angle Φ due to the curve B. The yaw angle Φ may be estimated by using the curve B and the wind speed ratio calculated from measurement of values of the wind speed by the anemometer L and the anemometer R. For example, if the wind speed ratio is "2", the yaw angle Φ is estimated at "about 15 degree"(see FIG. 5).

Hereinbelow, a method for the yaw control of the horizontal axis wind turbine 1 will be described.

The control device of the horizontal axis wind turbine 1 calculates the difference (wind speed difference) between a value of the wind speed measured by the anemometer L and a value of the wind speed measured by the anemometer R (step for calculating the wind speed difference). Then the control device estimates the yaw angle Φ by using the curve A of the graph showing relationship between the difference in the wind speeds and the yaw angle Φ (see FIG. 4) stored in the memory, and the wind speed difference calculated in the step for calculating a wind speed difference (step for estimating the yaw angle).

The control device turns the rotor 4 in a substantially horizontal plane based on the yaw angle Φ estimated in the step for estimating the yaw angle. Concretely speaking, in the case that the yaw angle Φ is plus (+), that is, in the case that a value of the wind speed measured by the anemometer L is higher than a value of the wind speed measured by the anemometer R since the wind blows from the left side of the nacelle 3, the rotor axis X of the rotor 4 is rotated to the anemometer L in such a way that the yaw angle Φ becomes 0 degree. Thus when the yaw angle approaches about 0 degree (when the rotor 4 faces nearly to the wind direction), the rotor is stopped.

On the other hand in the case that the yaw angle Φ is minus (−), that is, in the case that a value of the wind speed measured by the anemometer R is higher than a value of the wind speed measured by the anemometer L since the wind blows from the right side of the nacelle 3, the rotor axis X of the rotor 4 is rotated to the anemometer L in such a way that the yaw angle Φ converges to 0 degree. Thus when the yaw angle Φ approaches about 0 degree, the rotor is stopped (step for controlling the yaw angle).

A step for calculating the ratio (wind speed ratio) between values of the wind speed measured by the anemometers L and R (step for calculating the wind speed ratio) may be adopted instead of the step for calculating a wind speed difference. In this case, the control device estimates the yaw angle Φ with the curve B of the graph showing the relationship between the ratio between the wind speeds and the yaw angle Φ (see FIG. 5) stored in the memory, and with the wind speed ratio calculated in the step for calculating the wind speed ratio.

The horizontal axis wind turbine 1 according to the embodiment described above comprises the nacelle 3 having a symmetrical form with respect to an imaginary plane V including the rotor axis X of a rotor 4 and extending in the vertical direction, and the two anemometers (anemometer L and anemometer R) disposed at the positions of the both sides of the nacelle 3 which substantially oppose to each other with the imaginary plane V between them. Accordingly, difference is generated in wind speeds measured by the two anemometers regardless of the presence or absence of an upflow when the rotor does not face opposite the wind direction. The control device can estimate the yaw angle Φ based on the difference (or the ratio) between the wind speeds measured thus by the two anemometers (anemometer L and the anemometer R), and turn the rotor 4 in the substantially horizontal plane in such a way that the yaw angle Φ converges to 0 degree (the rotor 4 faces opposite the wind direction).

Accordingly, it is possible to achieve accurate yaw control by using the two anemometers (anemometer L and anemometer R) in case of the horizontal axis wind turbine 1 installed at a site where an upflow is often generated. Additionally, a yaw sensor is unnecessary because yaw control can be performed by using two anemometers, and accordingly, maintenance is facilitated and it is possible to retrench a cost required for production and attachment of a yaw sensor.

The above-described embodiment adopts the control logic of estimating the yaw angle Φ by using the correlation data of the difference or the ratio between the wind speeds and rotating the rotor axis X in such a way that the yaw angle Φ converges to 0 degree. Meanwhile it is also possible to perform control of the yaw angle Φ of the rotor 4 referring only values of the wind speed measured by the anemometer L and the anemometer R.

For example, whether the difference (wind speed difference) between a value measured by the anemometer L and a value measured by the anemometer R is not more than a predetermined threshold is determined (a step for determining the wind speed deference). If the wind speed difference is not more than the threshold, it is determined that the rotor 4 faces to the wind direction, and then the control finishes. Meanwhile if the wind speed difference is beyond said threshold, the rotor axis X is rotated to the anemometer measuring a higher value than the other anemometer. Then the wind speed difference falls not more than the threshold, it is determined that the rotor 4 faces to the wind direction, and then the rotor 4 is stopped (step for yaw control).

As for the above-described control, whether the rotor axis X is rotated or not is determined based on the wind speed difference. However a value for determining whether the rotor axis X is rotated or not, which is referred to as a control determination value, is not limited to the wind speed difference or ratio.

Adoption of the control logic makes it possible that yaw control with a very simple control logic using values of wind speeds measured by two anemometers (the anemometer L and the anemometer R), without using correlation data of the difference between wind speeds or correlation data of the ratio between wind speeds, and without a step for estimating the yaw angle. Also the rotor 4 can be made to face opposite the wind direction by turning the rotor 4 to equalize a value of the wind speed measured by the anemometer L and a value of the wind speed measured by the anemometer R. This control logic corresponds to the case that the above-described threshold of wind speed difference is set to "zero".

In addition, as for the embodiment of the present invention, the wind speed difference or ratio may be replaced by a value calculated from the wind speeds by such a suitable function as a logarithmic function or a suitable combination of functions.

The entire disclosure of Japanese Patent Applications No. Tokugan 2004-021180 filed on Jan. 29, 2004 including specification, claims, drawings and summary are incorporated herein by reference in its entirety.

What is claimed is:

1. A horizontal axis wind turbine of an upwind type comprising:
   a rotor for rotating around a rotor axis extending in a horizontal direction, the rotor being turned in a horizontal plane according to a wind direction;
   a nacelle having a symmetrical shape with respect to an imaginary plane including the rotor axis and extending a vertical direction;
   two anemometers disposed at positions of both side portions of the nacelle, the positions opposing each other across the imaginary plane; and
   a controller for controlling a yaw angle of the rotor based on wind speeds measured by the two anemometers.

2. The wind turbine as claimed in claim 1, wherein the controller estimates the yaw angle of the rotor based on at least one of a difference and a ratio of the wind speeds measured by the two anemometer, and turns the rotor so that the estimated yaw angle converges to 0 degree.

3. A method for controlling the wind turbine as claimed in claim 1, the method comprising:
   estimating the yaw angle of the rotor based on at least one of a difference and a ratio of the wind speeds measured by the two anemometers; and
   turning the rotor so that the estimated yaw converges to 0 degree.

4. A method for controlling the wind turbine as claimed in claim 1, the method comprising:
   determining whether a difference of the wind speeds measured by the two anemometers is not more than a predetermined threshold;
   turning the rotor to one anemometer which measures a higher wind speed than other anemometer, when the difference of the wind speeds exceeds the threshold; and
   stopping the turning of the rotor when the difference of the wind speeds falls not more than the threshold.

5. A method for controlling the wind turbine as claimed in claim 1, the method comprising:
   turning the rotor to equalize the wind speeds measured by the two anemometers.

6. A horizontal axis wind turbine comprising:
   a rotor for rotating around a rotor axis extending in a horizontal direction;
   a nacelle having a symmetrical shape with respect to an imaginary plane including the rotor axis and extending a vertical direction;
   two anemometers disposed at both side portions so that wind speeds measured by the anemometers are different except when a yaw angle of the rotor is 0 degree; and
   a controller for controlling the yaw angle of the rotor based on the wind speeds measured by the two anemometer.

7. The wind turbine as claimed in claim 6, wherein the wind turbine is a horizontal axis wind turbine of an upwind type.

8. The wind turbine as claimed in claim 6, wherein the controller controls the yaw angle based on at least one of a difference and a ratio between the wind speeds measured by the two anemometers.

9. The wind turbine as claimed in claim 6, wherein the controller compares the wind speeds measured by the two anemometers and turns the rotor to one anemometer which measures a higher wind speed than other anemometer.

10. The wind turbine as claimed in claim 6, wherein the controller calculates a control determination value from the wind speeds measured by the two anemometers; determines whether the control determination value is within a predetermined range or not; turns the rotor to an anemometer which measures a higher wind speed than other anemometer, when the control determination value is out of the predetermined range; and stops turning the rotor when the control determination value comes within the range.

11. The wind turbine as claimed in claim 6, wherein the controller determines whether a difference of the wind speeds measured by the two anemometers is not more than a predetermined threshold; turns the rotor to one anemometer which measures a higher wind speed than other anemometer, when the difference of the wind speeds exceeds the threshold; and stops turning the rotor when the difference of the wind speeds falls not more than the threshold.

12. The wind turbine as claimed in claim 6, wherein the controller estimates the yaw angle of the rotor based on the wind speeds measured by the two anemometers, and turns the rotor so that the estimated yaw angle converges to 0 degree.

13. The wind turbine as claimed in claim 6, wherein the controller turns the rotor to equalize the wind speeds measured by the two anemometers.

14. A method for controlling the wind turbine as claimed in claim 6, the method comprising:

controlling the yaw angle based on at least one of a difference and a ratio between the wind speeds measured by the two anemometers.

15. A method for controlling the wind turbine as claimed in claim 6, the method comprising:

comparing the wind speeds measured by the two anemometers; and turning the rotor to an anemometer which measures a higher wind speed than other anemometer.

16. A method for controlling the wind turbine as claimed in claim 6, the method comprising:

calculating a control determination value from the wind speeds measured by the two anemometers;

determining whether the control determination value is within a predetermined range or not;

turning the rotor to an anemometer which measures a higher wind speed than other anemometer, when the control determination value is out of the predetermined range; and stopping turning of the rotor when the control determination value comes within the range.

17. A method for controlling the wind turbine as claimed in claim 6, the method comprising:

determining whether a difference of the wind speeds measured by the two anemometers is not more than a predetermined threshold;

turning the rotor to one anemometer which measures a higher wind speed than other anemometer, when the difference of the wind speeds exceeds the threshold; and stopping turning of the rotor when the difference of the wind speeds falls not more than the threshold.

18. A method for controlling the wind turbine as claimed in claim 6, the method comprising:

estimating the yaw angle of the rotor based on the wind speeds measured by the two anemometers; and turning the rotor so that the estimated yaw angle converges to 0 degree.

19. A method for controlling the wind turbine as claimed in claim 6, the method comprising:

turning the rotor to equalize the wind speeds measured by the two anemometers.

* * * * *